United States Patent [19]
El-Hamamsy et al.

[11] Patent Number: 5,084,801
[45] Date of Patent: Jan. 28, 1992

[54] LIQUID CRYSTAL VARIABLE CAPACITOR AND HIGH INTENSITY DISCHARGE LAMP BALLAST EMPLOYING SAME

[75] Inventors: Sayed-Amr A. El-Hamamsy, Schenectady; Christopher P. Yakymyshyn, Saratoga Springs, both of N.Y.

[73] Assignee: General Electric Company, Schenectady, N.Y.

[21] Appl. No.: 656,665

[22] Filed: Feb. 19, 1991

[51] Int. Cl.[5] .................. H01G 5/00; H05B 41/16
[52] U.S. Cl. ................................ 361/277; 315/248
[58] Field of Search .............. 361/277; 315/248; 340/365 C

[56] References Cited

U.S. PATENT DOCUMENTS

| | | | |
|---|---|---|---|
| 4,529,968 | 7/1985 | Hilsum et al. | 340/365 C |
| 4,783,615 | 11/1988 | Dakin | 3165/248 |
| 4,810,938 | 3/1989 | Johnson et al. | 315/248 |
| 4,812,702 | 3/1989 | Anderson | 313/153 |
| 4,972,120 | 11/1990 | Witting | 313/638 |

Primary Examiner—Donald Griffin
Attorney, Agent, or Firm—Jill M. Breedlove; James C. Davis, Jr.; Marvin Snyder

[57] ABSTRACT

A variable capacitor comprises two conductive plates with a liquid crystal material having an anisotropic dielectric constant disposed therebetween. The conductive plates are treated with a surfactant to align the liquid crystal molecules in a predetermined direction at the interfaces between the conductive plates and the liquid crystal material. A low-frequency control voltage above a threshold voltage is applied across the conductive plates to orient the molecules of the liquid crystal material so that the molecular axis with the highest dielectric constant aligns parallel to the applied voltage. Upon removal of the control voltage, the liquid crystal molecules resume their original orientation. In this way, the dielectric constant of the variable capacitor is varied between two predetermined values, thus varying the capacitance of the variable capacitor between two discrete values proportional thereto. An alternative control provides continuous control over a range of capacitance values. Such a variable capacitor may be suitably employed in an electrodeless high intensity discharge lamp ballast for maintaining the ballast load in tune during both starting and running conditions.

19 Claims, 4 Drawing Sheets

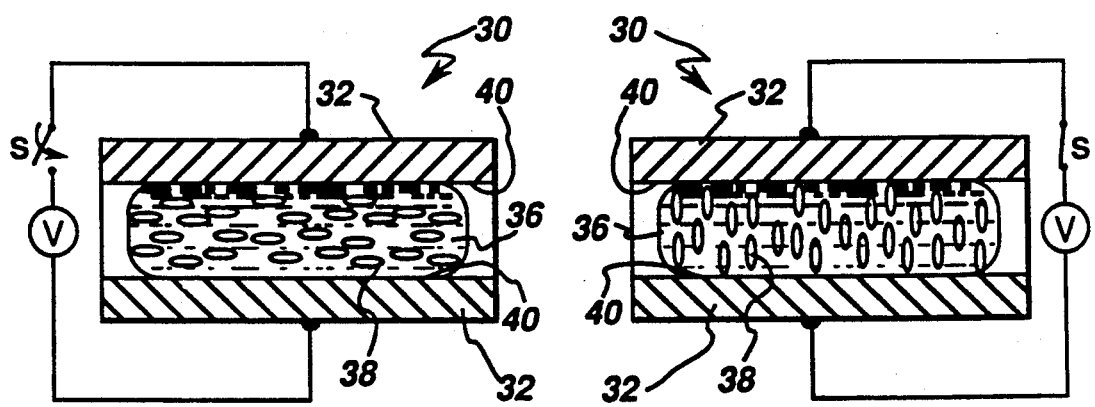
Fig. 2a  Fig. 2b
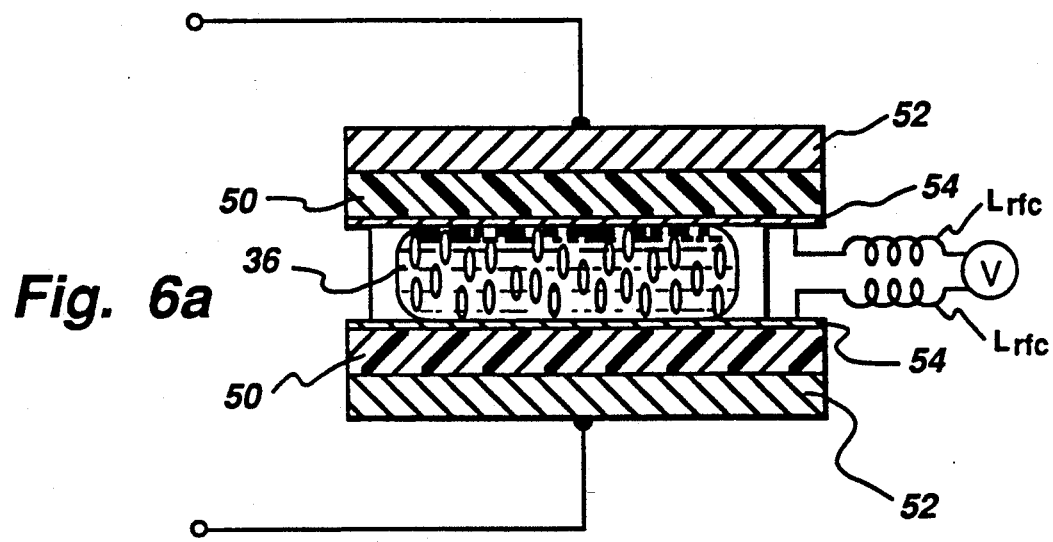
Fig. 6a
Fig. 6b

LIQUID CRYSTAL VARIABLE CAPACITOR AND HIGH INTENSITY DISCHARGE LAMP BALLAST EMPLOYING SAME

FIELD OF THE INVENTION

The present invention relates generally to a capacitor having a capacitance which is variable by virtue of a liquid crystal dielectric. More particularly, the present invention relates to such a variable capacitor which is useful for automatically tuning the ballast load circuit of an electrodeless HID lamp system as the output impedance thereof changes between starting and running conditions.

BACKGROUND OF THE INVENTION

Many circuits require automatic tuning capability in order to be practicable. One way to accomplish automatic circuit tuning is to use one or more variable capacitors. In low power circuits, for example, a varactor, which comprises a semiconductor device having a junction capacitance that varies with bias voltage, is often used for automatic tuning. Alternatively, for both low and high power applications, mechanical actuators (e.g. stepper motors) with feedback may be used to vary capacitance. The latter solution, however, is generally too costly and hence not practical for many applications.

In electrodeless high intensity discharge (HID) lamp ballasts, for example, automatic tuning is desirable because the output impedance of the ballast changes when a transition is made between starting and running conditions. In an electrodeless HID lamp, an arc discharge is generated by establishing a solenoidal electric field in a gas contained within an arc tube. In particular, the solenoidal electric field is created by the time-varying magnetic field of an excitation coil which is disposed about the arc tube. To maximize efficiency of an HID lamp, the degree of coil coupling between the magnetic field and the arc discharge must be maximized. Since the degree of coupling increases with frequency, electronic ballasts used to drive HID lamps operate at high frequencies in the range from 0.1 to 30 MHz, exemplary operating frequencies being 13.56 and 6.78 MHz. These exemplary frequencies are within the industrial, scientific, and medical (ISM) band of the electromagnetic spectrum in which moderate amounts of electromagnetic radiation are permissible; and such radiation is generally emitted by an electrodeless HID lamp system.

Operation of an HID lamp ballast at the series resonant frequency of the load circuit maximizes power output. However, operation at a frequency slightly higher than the series resonant frequency of the load circuit maximizes ballast efficiency. Hence, for maximum efficiency, operation is slightly "off" resonance, and a specific ballast load resistance and phase angle are required. To this end, the impedance of the ballast load, including that of the arc discharge as reflected into the ballast load, must be matched to the required ballast load resistance and phase angle. As described in commonly assigned, copending U.S. Pat. application Ser. No. 472,144, of J.C. Borowiec and S.A. El-Hamamsy, filed Jan. 30, 1990, which is incorporated by reference herein, a capacitance connected in parallel with the excitation coil is needed to match the resistive component of the ballast load impedance, and a capacitance connected in series with the excitation coil is needed to obtain the proper phase angle. However, although the series and parallel tuning capacitances provide a matched impedance under lamp-operating, or running, conditions, the output impedance of the ballast load circuit is different under starting conditions. Furthermore, in order to ensure that enough power is provided to start the lamp, the ballast should be tuned under starting conditions. Thereafter, i.e. after the lamp has started, the ballast must be tuned under running conditions for maximum efficiency operation. Therefore, it is desirable to provide a means for automatically tuning the ballast load circuit as the output impedance thereof changes between starting and running conditions.

OBJECTS OF THE INVENTION

Accordingly, an object of the present invention is to provide a new and improved variable capacitor.

Another object of the present invention is to provide a capacitor having a liquid crystal dielectric, the capacitance of the capacitor being variable by suitable application of electric fields thereto.

Still another object of the present invention is to provide a variable capacitor for automatically tuning the ballast load circuit of an electrodeless HID lamp system as the load impedance changes between starting and running conditions.

Yet another object of the present invention is to provide a variable capacitor for automatically tuning the ballast load circuit of an electrodeless HID lamp system as the load impedance changes due to component manufacturing tolerances and other variations during the lifetime of the circuit.

SUMMARY OF THE INVENTION

The foregoing and other objects of the present invention are achieved in a new and improved variable capacitor comprising two conductive plates with a liquid crystal material having an anisotropic dielectric constant disposed therebetween. The conductive plates are treated with a suitable coating to align the liquid crystal molecules in a predetermined direction at the interfaces between the conductive plates and the liquid crystal material. In accordance with the present invention, a control voltage is applied across the conductive plates to orient the molecules of the liquid crystal material so that the molecular axis with the highest dielectric constant aligns parallel to the applied voltage. The threshold voltage for such orientation of the liquid crystal molecules depends on the dielectric anisotropy of the liquid crystal material, the liquid crystal viscosity, the frequency of operation, and the separation of the conductive plates. Upon removal of the control voltage, the liquid crystal molecules resume their original orientation. In this way, the dielectric constant of the variable capacitor is varied between two predetermined values, thus varying the capacitance of the variable capacitor between two discrete values proportional thereto. In an alternative embodiment, a continuous control is employed to vary the capacitance over a range of values respectively proportional to a range of control voltage values.

A variable capacitor according to the present invention may be advantageously employed in a radio frequency ballast of an electrodeless HID lamp system to automatically tune the ballast load circuit as the output impedance thereof changes between starting and running conditions. In a preferred embodiment, the variable capacitor comprises a tuning capacitor connected in series with the excitation coil of the lamp. During lamp start-up, the molecules of a suitable liquid crystal material are aligned to provide a predetermined dielectric constant and hence the desired start-up capacitance for maintaining the impedance of the ballast load in tune during lamp-starting. After an arc discharge has been initiated, i.e., the lamp has started, a relatively low-frequency control voltage is applied across the conductive plates of the variable capacitor to reorient the liquid crystal molecules in a predetermined fashion, thereby changing the dielectric constant of the variable capacitor, and thus the capacitance thereof, in order to maintain the ballast load circuit in tune during lamp-running operation. When the control voltage is removed, the liquid crystal molecules resume their start-up orientation. In an alternative embodiment, a continuous control is employed to ensure that the ballast load is maintained in tune during lamp operation by automatically adjusting for load impedance variations under running conditions.

BRIEF DESCRIPTION OF THE DRAWINGS

The features and advantages of the present invention will become apparent from the following detailed description of the invention when read with the accompanying drawings in which:

FIG. 2 is a schematic illustration of a variable capacitor in accordance with the present invention useful in the electrodeless HID lamp ballast of FIG. 1;

DETAILED DESCRIPTION OF THE INVENTION

Figure 1:
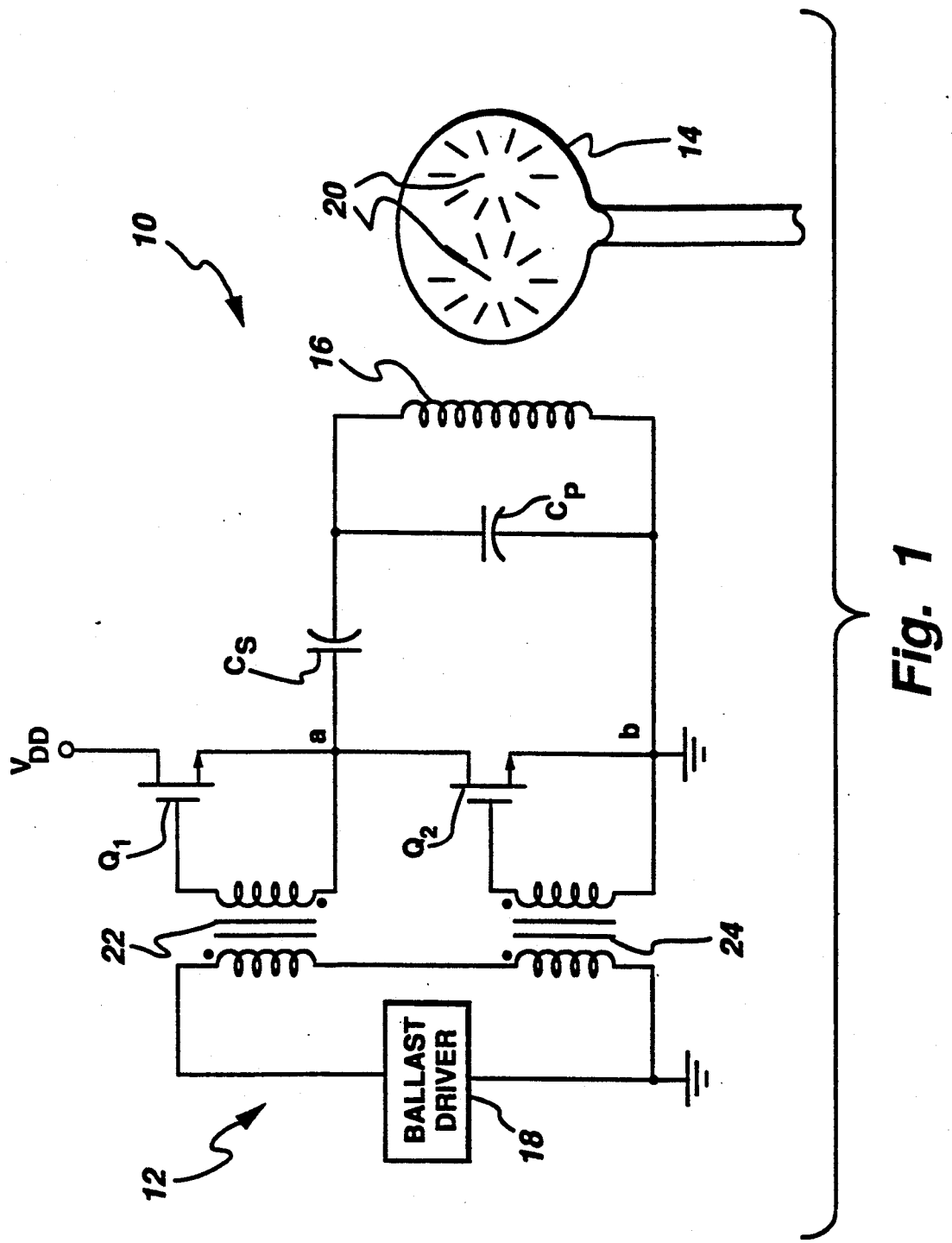
FIG. 1 is a schematic diagram of an electrodeless HID lamp and ballast.

FIG. 1 is a schematic diagram of an electrodeless HID lamp 10 and associated ballast 12, such as those described in the Borowiec and El-Hamamsy U.S. Pat. application, Ser. No. 472,144, cited hereinabove. The HID lamp includes an arc tube 14 formed of a high temperature glass, such as fused quartz, or an optically transparent ceramic, such as polycrystalline alumina. By way of example, arc tube 14 is shown as having a substantially ellipsoid shape. However, arc tubes of other shapes may be desirable, depending upon the application. For example, arc tube 14 may be spherical or may have the shape of a short cylinder, or "pillbox", having rounded edges, if desired.

Arc tube 14 contains a fill in which a solenoidal arc discharge is excited during lamp operation. A suitable fill, described in commonly assigned U.S. Pat. No. 4,810,938 of P.D. Johnson, J.T. Dakin and J.M. Anderson, issued on Mar. 7, 1989, comprises a sodium halide, a cerium halide and xenon combined in weight proportions to generate visible radiation exhibiting high efficacy and good color rendering capability at white color temperatures. For example, such a fill according to the Johnson et al. patent may comprise sodium iodide and cerium chloride, in equal weight proportions, in combination with xenon at a partial pressure of about 500 torr. The Johnson et al. patent is incorporated by reference herein. Another suitable fill is described in commonly assigned U.S. Pat. No. 4,972,120 of H.L. Witting, issued Nov. 20, 1990, which patent is incorporated by reference herein. The fill of the Witting patent comprises a combination of a lanthanum halide, a sodium halide, a cerium halide and xenon or krypton as a buffer gas. For example, a fill according to the Witting patent may comprise a combination of lanthanum iodide, sodium iodide, cerium iodide, and 250 torr partial pressure of xenon.

Electrical power is applied to the HID lamp by an excitation coil 16 disposed about arc tube 14 which is driven by an RF signal via a ballast driver 18 and ballast 12. (For clarity of illustration, coil 16 is not shown in its operational position about arc tube 14.) A suitable excitation coil 16 may comprise, for example, a two-turn coil having a configuration such as that described in commonly assigned, copending U.S. Pat. application Ser. No. 493,166, of G.A. Farrall, filed Mar. 14, 1990, which patent application is incorporated by reference herein. Such a coil configuration results in very high efficiency and causes only minimal blockage of light from the lamp. The overall shape of the excitation coil of the Farrall application is generally that of a surface formed by rotating a bilaterally symmetrical trapezoid about a coil center line situated in the same plane as the trapezoid, but which line does not intersect the trapezoid. However, other suitable coil configurations may be used with the starting aid of the present invention, such as that described in commonly assigned U.S. Pat. No. 4,812,702 of J.M. Anderson, issued Mar. 14, 1989, which patent is incorporated by reference herein. In particular, the Anderson patent describes a coil having six turns which are arranged to have a substantially V-shaped cross section on each side of a coil center line. Still another suitable excitation coil may be of solenoidal shape, for example.

In operation, RF current in coil 16 results in a time-varying magnetic field which produces within arc tube 14 an electric field that completely closes upon itself. Current flows through the fill within arc tube 14 as a result of this solenoidal electric field, producing a toroidal arc discharge 20 in arc tube 14. The operation of an exemplary electrodeless HID lamp is described in commonly assigned Dakin U.S. Pat. No. 4,783,615, issued on Nov. 8, 1988, which patent is incorporated by reference herein.

As illustrated in FIG. 1, HID lamp ballast 12 comprises a Class-D power amplifier including two switching devices $Q_1$ and $Q_2$ connected in series with a dc power supply $V_{DD}$ in a half-bridge configuration. Switching devices $Q_1$ and $Q_2$ are illustrated as MOSFET's, but other types of switching devices having capacitive gates may be used, such as insulated gate bipolar transistors (IGBT's) or MOS-controlled thyristors (MCT's). Switching devices $Q_1$ and $Q_2$ are coupled to ballast driver 18 via input isolation transformers 22 and 24, respectively. In operation, the switching devices are driven alternately between cutoff and saturation such that one is conducting while the other one is turned off and vice versa. Hence, the Class-D ballast may be conveniently driven by a square wave signal. Alternatively, ballast driver 18 may comprise means for generating two out-of-phase sinusoidal signals, as described in U.S. Pat. application Ser. No. 454,614 of S.A. El-Hamamsy and G. Jernakoff, filed Dec. 21, 1989, now allowed, which patent application is incorporated by reference herein.

A resonant load network is connected to the half-bridge at the junction between switching devices $Q_1$ and $Q_2$ and in parallel with switching device $Q_2$. The resonant load network comprises the excitation coil 16 of HID lamp 10 and a tuning capacitor $C_p$ connected in parallel therewith. The parallel combination of capacitor $C_p$ and coil 16 functions as an impedance transformer to reflect the impedance of the arc discharge 20 into the ballast load. A blocking/tuning capacitor $C_s$ is connected in series with the parallel combination of coil 16 and capacitor $C_p$. In particular, capacitor $C_s$ is used both for blocking dc voltage and for resonant circuit tuning.

Capacitors $C_s$ and $C_p$ are chosen to ensure impedance matching for maximum efficiency. That is, these capacitors are chosen to ensure that the ballast load is designed for optimum values of resistance and phase angle. As described in the Borowiec and El-Hamamsy U.S. Pat. application Ser. No. 472,144, cited hereinabove, the excitation coil of the HID lamp acts as the primary of a loosely-coupled transformer, while the arc discharge acts as both a single-turn secondary and secondary load. The impedance of the arc discharge is reflected to the primary, or excitation coil, side of this loosely-coupled transformer. To match the ballast load impedance for maximum efficiency, the parallel capacitor operates with the excitation coil to match the proper resistive load value, and the series capacitor acts with the combination of the excitation coil and parallel capacitance to yield the required phase angle.

FIG. 2 illustrates a variable capacitor 30 according to the present invention which may be advantageously employed as the series blocking/tuning capacitor $C_s$ in the electrodeless HID lamp ballast of FIG. 1. As shown, variable capacitor 30 comprises two conductive plates 32 with a liquid crystal material 36 disposed therebetween. Conductive plates 32 are comprised of a suitable electrically conductive material, such as copper or aluminum or the like. In the illustrated embodiment, liquid crystal material 36 is of the nematic type comprising molecules 38 of rod-like shape which tend to align with their long axes parallel to each other in the mesophase. (Alternatively, the liquid crystal molecules may be of the cholesteric type, as described hereinbelow.) The inner surfaces 40 of conductive plates 32 are treated with a coating, or surfactant, to promote alignment of molecules 38 so that their long axes are parallel to the surfaces of conductive plates 32, as shown in FIG. 2a. (Alternatively, the surfactant may be chosen so as to promote alignment of the long axes of molecules 38 perpendicular to the surfaces of the conductive plates, if desired.) Suitable surfactants are well-known in the art of liquid crystals.

Liquid crystal materials have anisotropic dielectric constants in the mesophase; i.e., their dielectric constants vary with direction of alignment. When an electric field above a threshold field is applied across conductive plates 32, molecules 38 align in such a way that the molecular axis with the highest dielectric constant aligns parallel to the electric field. The threshold electric field for orientation of the liquid crystal molecules as described depends on the dielectric anisotropy $\Delta\epsilon$ of the liquid crystal material, the liquid crystal viscosity, and the separation between the conductive plates. Dielectric anisotropy $\Delta\epsilon$ may be represented by the expression:

$$\Delta\epsilon = \epsilon_\parallel - \epsilon_\perp,$$

where $\epsilon_\parallel$ and $\epsilon_\perp$ are the dielectric constants parallel and perpendicular to the long axes of molecules 38, respectively. The threshold electric field for liquid crystal materials having a positive dielectric anisotropy, i.e. $\Delta\epsilon > 0$, is independent of the separation of the conductive plates for relatively small separations, e.g. $<25$ $\mu$m, and corresponds to a few volts.

In accordance with the present invention, the capacitance of variable capacitor 30 is varied by the selective application of a control voltage V across conductive plates 32. In particular, as is well-known in the art, the capacitance C of a parallel-plate capacitor is determined according to the following formula:

$$C = \epsilon \frac{A}{d},$$

where $\epsilon$ is the dielectric constant of the dielectric material disposed between the conductive plates, A is the surface area of the dielectric material between the conductive plates, and d is the distance between the conductive plates. Hence, by varying the dielectric constant $\epsilon$ of a capacitor, the capacitance thereof changes in proportion thereto.

Figure 3:
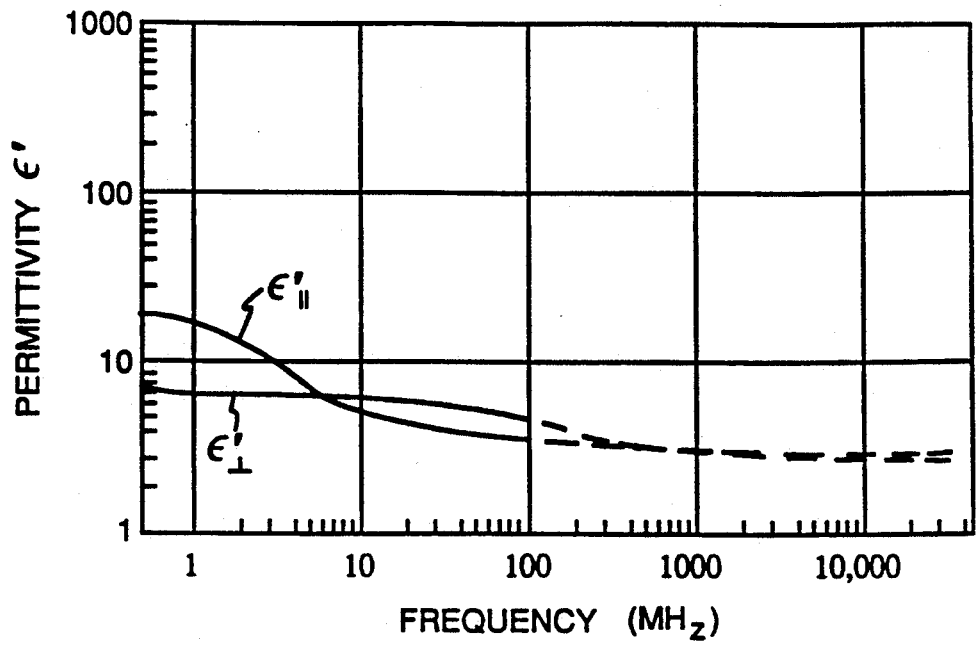
FIG. 3 is a graph of permittivity versus frequency for a typical cyanobiphenyl liquid crystal material.

The dielectric anisotropy of liquid crystal materials is frequency dependent. To illustrate, FIG. 3 is a graph of permittivity $\epsilon'$ (the dielectric constant $\epsilon$ multiplied by the permittivity of free space, a constant) versus frequency for a typical cyanobiphenyl liquid crystal material. As shown, at low frequencies, a large dielectric anisotropy $\Delta\epsilon$ exists. (A suitable liquid crystal material has a dielectric anisotropy $\Delta\epsilon$ in the range from approximately 1 to 20 at low frequencies.) At an intermediate frequency, the anisotropy is zero. At higher frequencies, however, the dielectric constants and the dielectric anisotropy are much lower. (A suitable liquid crystal material has a dielectric anisotropy $\Delta\epsilon$ in the range from approximately 0.1 to 1 at radio frequencies.)

Figure 4:
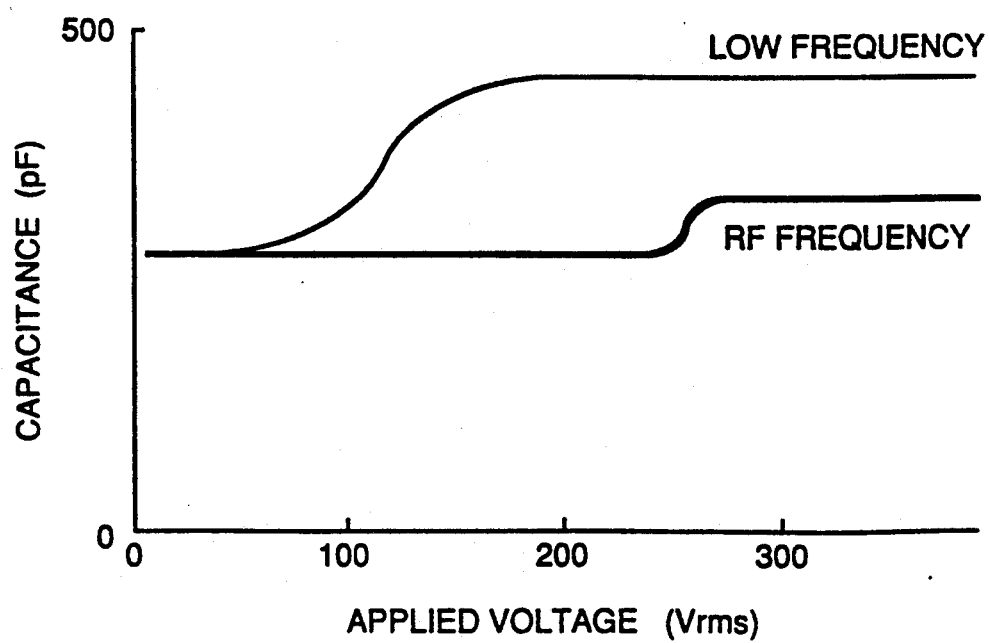
FIG. 4 graphically illustrates capacitance versus applied voltage for an exemplary liquid crystal material.

As a result of the frequency dependent dielectric anisotropy, the threshold voltage for reorientation of the liquid crystal molecules, and hence a change in capacitance, is much lower at low frequencies than for RF. This is illustrated graphically in FIG. 4.

The fact that the dielectric anisotropy of liquid crystal materials is frequency dependent is advantageously employed in the present invention. For example, as stated hereinabove, an electrodeless HID lamp ballast operates at radio frequencies, such as 6.78 or 13.56 MHz. At such high frequencies, the dielectric anisotropy of liquid crystal materials is typically very small (e.g., $\Delta\epsilon \leq 1$) so that RF signals below the RF threshold voltage will not affect significantly the orientation of the liquid crystal dielectric of the capacitor and thus will not change the capacitance thereof. At relatively low frequencies, however, the dielectric anisotropy of liquid crystal materials is typically very high (e.g., $\Delta\epsilon > 10$). Hence, in accordance with the present invention, a low-frequency control voltage above the low-frequency threshold voltage may be applied to the variable capacitor in the RF ballast circuit for the purpose of automatically varying the capacitance thereof and maintaining the ballast circuit in tune during both starting and operating conditions. Suitable control voltage frequencies are in the range from 0 to 1 MHz, with a preferred range being from 10 to 500 kHz, and a more preferred range being from 10 to 50 kHz.

In operation, the capacitance of variable capacitor 30 of FIG. 2 is varied as follows. As shown, a switch S is coupled in series with a relatively low-frequency voltage source V, the series combination of the switch and the voltage source being coupled in parallel with the variable capacitor 30. Initially, as shown in FIG. 2a, during lamp start-up, the switch S is open, and the long axes of molecules 38 of the liquid crystal material are aligned in a predetermined direction. For illustrative purposes, the long axes of molecules 38 are shown as being initially aligned parallel to conductive plates 32. The dielectric constant of the liquid crystal molecules in this position has a first predetermined value $\epsilon_1$ corresponding to the capacitance necessary to maintain the ballast in tune during lamp-starting. After the lamp has started, i.e., an arc discharge has been initiated, switch S is closed, as shown in FIG. 2b, resulting in the application of low-frequency voltage V (which is above the low-frequency threshold voltage) across conductive plates 32 and 34. As a result, the long axes of molecules 38 are reoriented so that their long axes are perpendicular to conductive plates 32. The dielectric constant of the liquid crystal molecules in this position has a second predetermined value $\epsilon_2$ corresponding to the capacitance necessary to maintain the ballast in tune during lamp-operating, or running, conditions.

Although operation of the liquid crystal variable capacitor of the present invention has been described with respect to discrete control between two capacitance values, one of ordinary skill in the art would appreciate that continuous control of the liquid variable capacitor for variation of the capacitance thereof over a range of values is also possible. A suitable control for such a continuously variable capacitor is described in commonly assigned U.S. Pat. application Ser. No. 631,836, of S.A. El-Hamamsy and J.C. Borowiec, filed Dec. 21, 1990, which patent application is incorporated by reference herein. In particular, El-Hamamsy and Borowiec describe a closed-loop control system wherein sensed ballast load currents and voltages are applied to a phase detector for detecting the phase angle therebetween and for generating a voltage proportional thereto. The output voltage from the phase detector is compared to a reference voltage by an error amplifier. The resulting error voltage is employed as the input signal to control circuitry for maintaining the Class-D circuit in tune for maximum efficiency operation.

The following example illustrates that a variable capacitor according to the present invention may be suitably constructed for application in an electrodeless HID lamp ballast.

EXAMPLE

A liquid crystal cell comprising conductive plates 32 and liquid crystal material 36 (FIG. 2) is 0.2 mm thick with a dielectric constant $\epsilon$ of approximately 5 at RF. The dielectric anisotropy $\Delta\epsilon = 10$ at low frequencies, while at RF, $\Delta\epsilon = 1$. Assuming a 300 picofarad (pF) capacitor with a 30 pF variation, the required RF dielectric anisotropy change is 10%. For a ratio of RF to low-frequency threshold voltages of 3.3 and a required drive voltage of approximately 100 V, RF-induced liquid crystal reorientation should not occur provided that the RF RMS voltage is kept below approximately $100 \times 3.3 = 330$ V. The resulting capacitance/area of the liquid crystal cell is approximately 22 pF/cm$^2$, giving a total capacitance area of approximately 14 cm$^2$.

A suitable liquid crystal material may be of a nematic type, e.g. cyanobiphenyl materials having a large positive or negative dielectric anisotropy ($|\Delta\epsilon| \geq 1$) at low frequencies and a very small dielectric anisotropy at high frequencies, e.g., 6.8 or 13.56 MHz. For such liquid crystal materials, applied RF fields do not reorient the liquid crystal molecules provided the liquid crystal layer is sufficiently thick, e.g. $>500$ μm. However, a low-frequency ac signal superimposed on the RF signal reorients the liquid crystal molecules, since the dielectric anisotropy at low frequencies is much larger than at RF, e.g. $\Delta\epsilon > 10$.

Alternatively, a suitable liquid crystal material may be a nematic type having a large negative dielectric anisotropy at high frequencies ($\Delta\epsilon$ is approximately in the range from $-1$ to $-5$) at high frequencies. For such liquid crystal materials, the applied RF fields reorient the liquid crystal molecules such that they are parallel to the conductive plates 32 shown in FIG. 2. However, a low-frequency ac signal reorients the liquid crystal molecules such that they are perpendicular to the surfaces of the conductive plates, since the dielectric anisotropy at low frequencies is positive and larger (e.g., $\Delta\epsilon > 10$) than at RF. The RF field opposes the orientational effects of the low-frequency field. Such a device may be advantageously employed for continuous control, such as that described hereinabove.

Alternatively, a cholesteric liquid crystal material may be used. In particular, a cholesteric liquid crystal material is a nematic liquid crystal material having a molecular axis that follows a helical path. By orienting the liquid crystal layer such that the axes of the helices are perpendicular to the conductive surfaces, i.e. the long molecular axes are parallel to the conductive surfaces, an applied low-frequency electric field effectively unwinds the helices, resulting in a net change in dielectric anisotropy. A suitable cholesteric liquid crystal material is a cyanobiphenyl mixture doped with cholesteryl nonanoate having a small RF dielectric anisotropy. For cholesteric liquid crystal materials, however, the threshold voltage is more strongly dependent on the separation of the conductive plates than the nematic liquid crystal materials described hereinabove. Advantageously, however, higher RF threshold voltages can be achieved for cholesteric liquid crystal materials by using thinner liquid crystal layers, also resulting in a larger capacitance per unit area.

Figure 5:
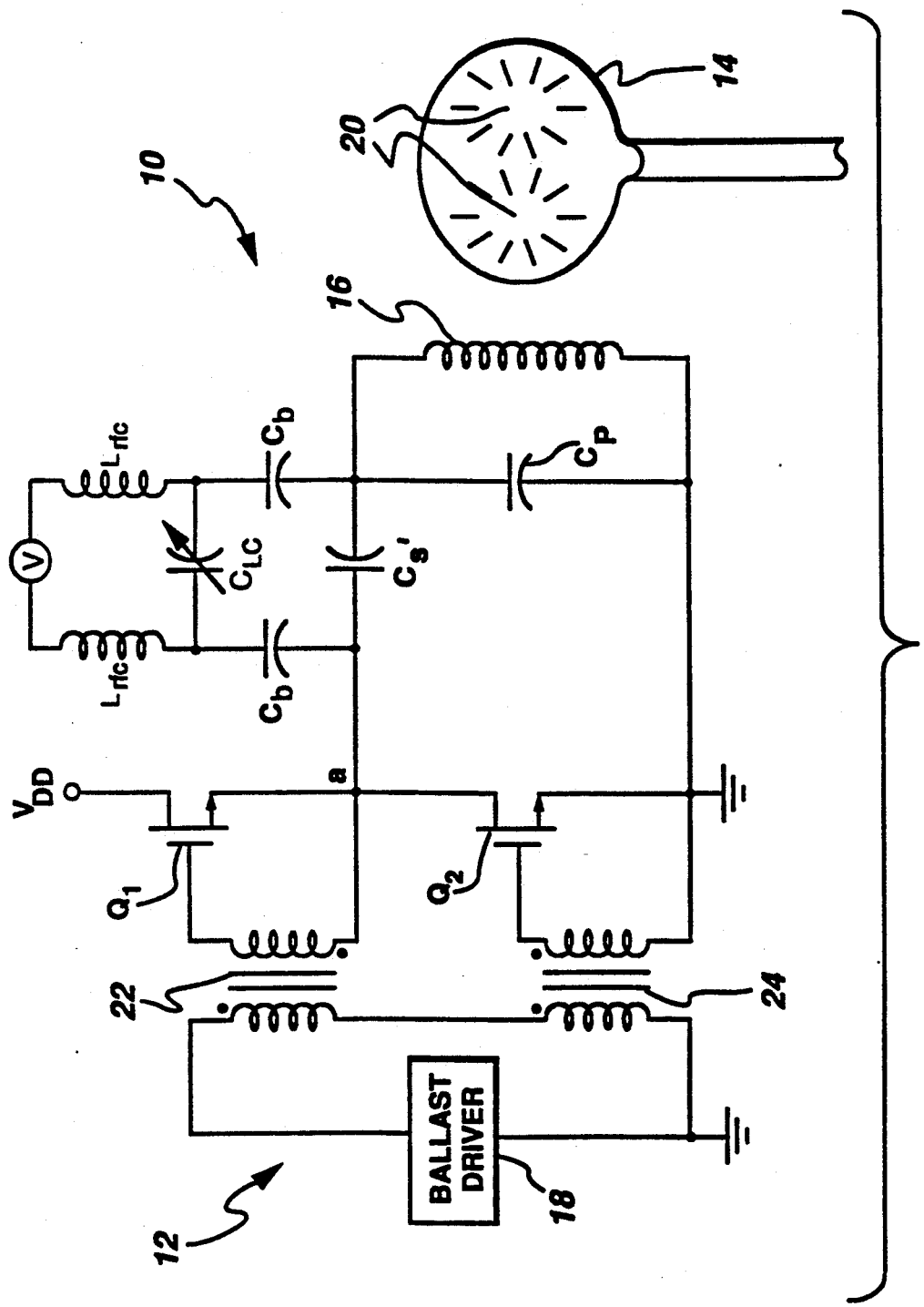
FIG. 5 is a schematic illustration of an electrodeless HID lamp and ballast employing a variable capacitor in accordance with one preferred embodiment of the present invention.

In an electrodeless HID lamp ballast, the low-frequency capacitor control voltage V is preferably isolated from the RF portion of the ballast circuit. According to a preferred embodiment, as shown in FIG. 5, a pair of inductors $L_{rfc}$ are coupled in series with a liquid crystal variable capacitor $C_{LC}$ on either side thereof. Inductors $L_{rfc}$ are further coupled in series with low-frequency voltage source V. Liquid crystal variable capacitor $C_{LC}$ is connected in parallel with a fixed capacitor $C_s'$. Together, capacitors $C_{LC}$ and $C_s'$ comprise the series blocking/tuning capacitor $C_s$ of an electrodeless HID lamp ballast such as that shown in FIG. 1. Inductors $L_{rfc}$ have a very high impedance at RF and a low impedance at the driving frequency of the voltage source V. In addition, blocking capacitors $C_b$ are provided between the junctions joining capacitors $C_{LC}$ and $C_s'$ to block the low-frequency voltage signal V from the RF portion of the ballast circuit.

FIG. 6 illustrates a preferred construction of the combination of blocking capacitors $C_b$ and liquid crystal variable capacitor $C_{LC}$ suitable for use in the lamp ballast of FIG. 5. Two dielectric layers 50 are situated between conductive plates 52. The dielectric layers are not affected by either low-frequency or RF signals. The inner surfaces of the dielectric layers are each coated with either a continuous or patterned electrode 54. Liquid crystal material 36 is disposed between electrodes 54. The blocking capacitors $C_b$ are thus formed by the respective combinations of conductive plates 52 with the corresponding dielectric layers 50 and electrodes 54, while liquid crystal variable capacitor $C_{LC}$ is formed by the combination of liquid crystal material 36 and electrodes 54. The two blocking capacitors are fixed in value, while the liquid crystal variable capacitor $C_{LC}$ is voltage-dependent. The RF ballast signal is coupled through the stack of capacitors $C_b$ and $C_{LC}$. However, the low-frequency control signal V is coupled only across the liquid crystal layer 36 via the two thin metal electrodes 54. In addition, two series inductors $L_{rfc}$ are included to isolate the low-voltage source from the RF signals in the ballast circuit.

There are two conflicting requirements for blocking capacitors $C_b$: (1) To avoid coupling the low-frequency signal to the RF leads, the two fixed blocking capacitors $C_b$ formed by the dielectric layers must have a high impedance at low frequencies, i.e., a low capacitance; and (2) To maximize the variation in overall RF capacitance of the three-capacitor stack due to variations in the liquid crystal capacitance, the two blocking capacitors $C_b$ must have a much larger capacitance than the liquid crystal variable capacitor $C_{LC}$. A three-capacitor structure meeting the hereinabove requirements may be constructed using a liquid crystal layer that is sufficiently thick to cause the capacitance of the liquid crystal variable capacitor to be lower than that of the blocking capacitors at low frequencies. Alternatively, the low-frequency electrodes may be patterned in the form of a grid 54', as illustrated in FIG. 6b. Such a grid pattern reduces the effective electrode area of the blocking capacitors for the low-frequency signals, but does not affect the RF blocking capacitor electrode area. As a result, the blocking capacitance is sufficiently low to block low-frequency signals from the RF ballast circuit, but is maintained sufficiently high for coupling RF signals to the variable capacitor $C_{LC}$.

In another aspect of the present invention, continuous control of the liquid crystal variable capacitor is employed to stabilize circuit operation at a particular operating point. Over time, the values of the components of the resonant ballast load circuit may change, e.g., due to component manufacturing tolerances and other variations during the circuit lifetime. By employing a suitable continuous control, such as that described in the El-Hamamsy and Borowiec U.S. Pat. application Ser. No. 631,836, cited hereinabove, however, the liquid crystal molecules can be continuously re-aligned so that resonant operation is maintained.

In yet another aspect of the present invention, continuous control of the liquid crystal variable capacitor using the amplitude of the RF signal is employed to stabilize circuit operation at a particular operating point. That is, for a variable capacitor with a liquid crystal dielectric having a small dielectric anisotropy at RF, the capacitor has a voltage-dependent capacitance at RF if the liquid crystal layer is sufficiently thin. For example, assume that at resonance, the capacitor RF voltage is sufficient to partially align the liquid crystal molecules to achieve the desired operating capacitance. Over time, however, the values of the components of the resonant ballast load circuit may change. As a result, operation moves off the near-resonant operating point, which changes the capacitor RF voltage and alters the alignment of the liquid crystal molecules. The altered liquid crystal alignment changes the capacitance of the liquid crystal capacitor. By suitable design of the liquid crystal capacitor (i.e., suitable thickness, dielectric anisotropy, etc.), the resulting change in liquid crystal capacitance can be made to exactly account for the original changes in component values. To this end, for a series resonant circuit operating above resonance, the liquid crystal dielectric layer must have a sufficiently positive or negative dielectric anisotropy such that the molecules thereof automatically change their orientation in response to a change in resonant circuit impedance in order to adjust the capacitance of the variable capacitor to maintain operation substantially at the operating point of the series resonant circuit.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. In a series resonant circuit having an operating point above resonance, a variable capacitor, comprising:
   two substantially parallel, conductive plates having a liquid crystal material disposed therebetween;
   a coating disposed on the inner surface of each of said conductive plates for causing alignment of the molecules of said liquid crystal material in a first predetermined direction, said liquid crystal material having a first dielectric constant value when said molecules are oriented in said first predetermined direction;
   said liquid crystal material having a sufficiently large dielectric anisotropy such that the molecules thereof automatically change their orientation in response to a change in resonant circuit impedance in order to adjust the capacitance of said variable capacitor to maintain operation substantially at the operating point of said series resonant circuit.

2. A ballast for an electrodeless high intensity discharge lamp of the type having an excitation coil situated about an arc tube for exciting an arc discharge therein upon application of a radio frequency signal to said excitation coil, said ballast comprising:
   first and second switching devices connected in series in a half-bridge configuration with a junction therebetween;
   ballast drive means coupled to said first and second switching devices, said ballast drive means being adapted to be coupled to an RF power supply for alternately driving said first and second switching devices;
   resonant circuit means coupled to said first and second switching devices at the junction therebetween, said resonant circuit means comprising said excitation coil, a parallel capacitor in parallel combination with said excitation coil, and a series capacitor coupled in series with said parallel combination, said series capacitor comprising two substantially parallel, conductive plates having a liquid crystal material disposed therebetween, said conductive plates each having a coating disposed on the inner surface thereof for causing alignment of the molecules of said liquid crystal material in a first predetermined direction, said liquid crystal material having a first dielectric constant value when said molecules are oriented in said first predetermined direction; and means for applying a control voltage across said conductive plates so as to align the molecules of said liquid crystal material in a range of directions depending on the impedance of said resonant circuit means, said liquid crystal material having a range of dielectric constant values which depend on the direction of alignment.

3. The ballast of claim 2 wherein:
said control voltage is at a relatively low frequency; and
said liquid crystal material has a relatively small dielectric anisotropy at the operating radio frequency of said ballast and a substantially larger dielectric anisotropy at relatively low frequencies.

4. The ballast of claim 3 wherein said control voltage is at a relatively low frequency in the range from 0 to 1 MHz.

5. The ballast of claim 4 wherein said control voltage is at a relatively low frequency in the range from approximately 10 to 500 kHz.

6. The ballast of claim 5 wherein said control voltage is at a relatively low frequency in the range from approximately 10 to 50 kHz.

7. The ballast of claim 2 wherein the magnitude of the dielectric anisotropy of said liquid crystal material at relatively low frequencies is in the range from approximately 1 to 20 and at radio frequencies is in the range from approximately 0.1 to 1.

8. The ballast of claim 2 wherein said means for applying a control voltage include means for isolating said control voltage from the RF voltage across said variable capacitor.

9. The ballast of claim 8 wherein said isolating means comprises:
an inductor coupled in series with said series capacitor on either side thereof, each said inductor being coupled in series with said control voltage; and
blocking capacitor means coupled in series between said variable capacitor and the RF portion of said ballast.

10. The ballast of claim 9 wherein said blocking capacitor means comprises a pair of blocking capacitors coupled in series with said variable capacitor on either side thereof, each of said blocking capacitors comprising an additional conductive plate parallel to a respective one of said conductive plates of said variable capacitor with a dielectric material disposed between the respective conductive plate and said additional conductive plate.

11. A ballast for an electrodeless high intensity discharge lamp of the type having an excitation coil situated about an arc tube for exciting an arc discharge therein upon application of a radio frequency signal to said excitation coil, said ballast comprising:
first and second switching devices connected in series in a half-bridge configuration with a junction therebetween;
ballast drive means coupled to said first and second switching devices, said ballast drive means being adapted to be coupled to an RF power supply for alternately driving said first and second switching devices;
resonant circuit means coupled to said first and second switching devices at the junction therebetween, said resonant circuit means comprising said excitation coil, a parallel capacitor in parallel combination with said excitation coil, and a series capacitor coupled in series with said parallel combination, said series capacitor comprising two substantially parallel, conductive plates having a liquid crystal material disposed therebetween, said conductive plates each having a coating disposed on the inner surface thereof for causing alignment of the molecules of said liquid crystal material in a first predetermined direction, said liquid crystal material having a first dielectric constant value when said molecules are oriented in said first predetermined direction; and means for applying a control voltage across said conductive plates of said series capacitor so as to align the molecules of said liquid crystal material in a second predetermined direction, said liquid crystal material having a second dielectric constant value when said molecules are oriented in said second predetermined direction.

12. The ballast of claim 11 wherein:
said control voltage is at a relatively low frequency; and
said liquid crystal material has a relatively small dielectric anisotropy at the operating radio frequency of said ballast and a substantially larger dielectric anisotropy at relatively low frequencies.

13. The ballast of claim 12 wherein said control voltage is at a relatively low frequency in the range from 0 to 1 MHz.

14. The ballast of claim 13 wherein said control voltage is at a relatively low frequency in the range from approximately 10 to 500 kHz.

15. The ballast of claim 14 wherein said control voltage is at a relatively low frequency in the range from approximately 10 to 50 kHz.

16. The ballast of claim 15 wherein the magnitude of the dielectric anisotropy of said liquid crystal material at relatively low frequencies is in the range from approximately 1 to 20 and at radio frequencies is in the range from approximately 0.1 to 1.

17. The ballast of claim 12 wherein said means for applying a control voltage include means for isolating said control voltage from the RF voltage across said variable capacitor.

18. The ballast of claim 17 wherein said isolating means comprises:
an inductor coupled in series with said series capacitor on either side thereof, each said inductor being coupled in series with said control voltage; and
blocking capacitor means coupled in series between said variable capacitor and the RF portion of said ballast.

19. The ballast of claim 18 wherein said blocking capacitor means comprises a pair of blocking capacitors coupled in series with said variable capacitor on either side thereof, each of said blocking capacitors comprising an additional conductive plate parallel to a respective one of said conductive plates of said variable capacitor with a dielectric material disposed between the respective conductive plate and said additional conductive plate.

* * * * *